United States Patent
Dahlman et al.

(10) Patent No.: US 9,496,918 B2
(45) Date of Patent: *Nov. 15, 2016

(54) MULTICARRIER COMMUNICATION SYSTEM EMPLOYING EXPLICIT FREQUENCY HOPPING

(71) Applicant: TELEFONAKTIEBOLAGET LM ERICSSON (PUBL), Stockholm (SE)

(72) Inventors: Erik Dahlman, Bromma (SE); Ylva Jading, Stockholm (SE); Per Skillermark, Årsta (SE); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,811

(22) Filed: Jul. 18, 2014

(65) Prior Publication Data

US 2014/0328375 A1 Nov. 6, 2014
US 2016/0211883 A9 Jul. 21, 2016

Related U.S. Application Data

(63) Continuation of application No. 12/672,299, filed as application No. PCT/SE2008/050581 on May 16, 2008, now Pat. No. 9,294,238.

(60) Provisional application No. 60/954,731, filed on Aug. 8, 2007.

(51) Int. Cl.
*H04W 4/00* (2009.01)
*H04B 1/713* (2011.01)
*H04L 5/00* (2006.01)

(52) U.S. Cl.
CPC .............. *H04B 1/713* (2013.01); *H04L 5/0012* (2013.01); *H04L 5/0092* (2013.01); *H04L 5/0037* (2013.01)

(58) Field of Classification Search
CPC ............................ H04B 1/713; H04L 5/0092
See application file for complete search history.

(56) References Cited

U.S. PATENT DOCUMENTS 6,246,713 B1 * 6/2001 Mattisson ................ 375/132
2005/0068884 A1 3/2005 Yoon et al.
(Continued)

FOREIGN PATENT DOCUMENTS

| EP | 1039683 A2 | 9/2000 |
|---|---|---|
| GB | 2446197 A | 8/2008 |

(Continued)

OTHER PUBLICATIONS

NEC Group. "Frequency Hopping Pattern for EUTRA Uplink." TSG-RAN WG1 #49bis, R1-072828, Orlando, USA, Jun. 25-29, 2007, pp. 1-4.

(Continued)

Primary Examiner — Derrick Ferris
Assistant Examiner — Farhad Ali
(74) Attorney, Agent, or Firm — Coats & Bennett, PLLC

(57) ABSTRACT

Variable bandwidth assignment and frequency hopping are employed to make efficient use of radio resources. Variable bandwidth assignment is achieved by dynamically allocating different numbers of subcarriers to different mobile terminals depending on their instantaneous channel conditions. The frequency hopping patterns are determined "on-the-fly" based on the current bandwidth assignments. The bandwidth assignments and frequency hopping patterns are signaled to the mobile terminals in a scheduling grant.

15 Claims, 9 Drawing Sheets

(56) References Cited

U.S. PATENT DOCUMENTS

| | | | |
|---|---|---|---|
| 2007/0110104 A1 | 5/2007 | Sartori et al. | |
| 2007/0248147 A1 | 10/2007 | Tiirola et al. | |
| 2008/0013599 A1 | 1/2008 | Malladi | |
| 2008/0101319 A1* | 5/2008 | Rao | 370/342 |
| 2009/0147748 A1 | 6/2009 | Ofuji et al. | |

FOREIGN PATENT DOCUMENTS

| | | |
|---|---|---|
| JP | 2007151059 A | 6/2007 |
| WO | 2004077777 A1 | 9/2004 |
| WO | 2006034578 A1 | 4/2006 |
| WO | 2006102744 A1 | 10/2006 |
| WO | 2006135187 A2 | 12/2006 |
| WO | 2007075133 A1 | 7/2007 |
| WO | 2008008748 A2 | 1/2008 |

OTHER PUBLICATIONS

LG Electronics. "UL frequency hopping over subbands." 3GPP TSG RAN WG1 #49bis, R1-072879, Orlando, USA, Jun. 25-29, 2007, pp. 1-4.

Nokia Siemens Networks, et al. "Uplink Scheduling Request for LTE." 3GPP TSG RAN WG1 #49, R1-072307, Kobe, Japan, May 7-11, 2007, pp. 1-2.

ETRI. "Reliable transmission of 1st UL message in random access." 3GPP TSG RAN WG1 Meeting #47, R1-063518, Riga, Latvia, Nov. 6-10, 2006, pp. 1-3.

NTT DOCOMO, et al. "Persistent Scheduling in E-UTRA." 3GPP TSG RAN WG1 Meeting #49bis, R1-072950 (Original R1-070098), Orlando, USA, Jun. 25-29, 2007, pp. 1-6.

LG Electronics. "UL frequency hopping." 3GPP TSG RAN WG1 #49, R1-072349 (resubmission of R1-071558), Kobe, Japan, May 7-11, 2007, pp. 1-5.

Motorola. "E-UTRA Uplink Control Signaling + TP." TSG-RAN WG1 #45, R1-061172, Shanghai, China, May 8-12, 2006, pp. 1-8.

Chen, Q. et al. "Multicarrier CDMA with Adaptive Frequency Hopping for Mobile Radio Systems." IEEE Journal on Selected Areas in Communications, vol. 14, No. 9, Dec. 1996, pp. 1852-1858.

Laroia, R. et al. "Designing a Mobile Broadband Wireless Access Network." IEEE Signal Processing Magazine, vol. 21, Issue 5, Sep. 2004, pp. 20-28.

Craig, S. et al. "Synchronization Strategies for GSM/EDGE Networks." IEEE VTS 53rd Vehicular Technology Conference, vol. 4, 2001, pp. 2670-2674.

Kostic, Z. et al. "Dynamic Frequency Hopping in Cellular Systems with Network Assisted Resource Allocation." 2000 IEEE 51st Vehicular Technology Conference, 2000, VTC 2000—Spring Tokyo, May 15-18, 2008, vol. 3, pp. 2459-2463.

Mubarek, O. et al. "Dynamic Frequency Hopping in Cellular Fixed Relay Networks." 2005 IEEE 61st Vehicular Technology Conference, VTC 2005 Spring, Stockholm, Sweden, May 30-Jun. 1, 2005, vol. 5, pp. 3112-3116.

* cited by examiner

MULTICARRIER COMMUNICATION SYSTEM EMPLOYING EXPLICIT FREQUENCY HOPPING

This application is a continuation of pending U.S. patent application Ser. No. 12/672,299, filed Jun. 15, 2011. This application claims priority to PCT Application PCT/SE2008/050581 filed May 16, 2008.

TECHNICAL FIELD

The present invention relates generally to multicarrier communication systems and, more particularly, to an Orthogonal Frequency Division Multiplexing (OFDM) system that employs frequency hopping.

BACKGROUND

Frequency hopping is a spread spectrum technique used in many radio-communication applications. In a frequency hopping spread spectrum system, the transmitter changes the frequency of its transmissions over time according to a pseudorandom hopping pattern. In effect, the transmitter "hops" from one frequency to another during transmission to spread its signal over a wide frequency band, while at any given moment, the transmitted signal occupies a narrow frequency band. The hopping period, referred to herein as a time slot, is the time interval during which the frequency remains constant. The frequency hopping pattern comprises the sequence of frequencies over which the transmitter hops.

Frequency hopping provides frequency diversity, which helps mitigate the effects of multipath fading provided that the spacing between sub-carriers is sufficiently large so that fading is uncorrelated across the different frequencies. Most mobile-communication systems apply channel coding at the transmitter side and corresponding channel decoding at the receiver side. To take advantage of the frequency diversity provided by frequency hopping, a block of coded information should be spread out over multiple hops, i.e. multiple time slots.

Frequency hopping may be used to share a radio resource between multiple users. In conventional frequency hopping systems, different mobile terminals within the same cell or sector of a mobile communication system are assigned mutually orthogonal frequency hopping patterns so that the mobile devices will not transmit simultaneously on the same frequency in the same time slot. One way to ensure that the hopping patterns are mutually orthogonal is to use the same basic hopping pattern for all mobile devices with different frequency offsets for each mobile terminal.

Between cells, different non-orthogonal frequency-hopping patterns are typically used, implying that simultaneous transmissions from two mobile devices in neighboring cells in the same frequency band during the same time slot may take place. When this happens, a "collision" occurs, implying a high interference level during the corresponding time slot. However, due to the channel coding spanning several hops, the channel decoder can typically still decode the information correctly.

Frequency hopping may be applied in Orthogonal Frequency Division Multiplexing (OFDM) systems. In OFDM systems, a wideband carrier is divided into a plurality of subcarriers. A Fast Fourier Transform is applied to the modulation symbols to spread the modulation symbols over multiple subcarriers of the wideband carrier. Frequency hopping may be implemented in OFDM systems by varying the subcarrier assignments.

Recently, there has been interest in using variable bandwidth allocations in the uplink of OFDM systems. The basic concept is to vary the bandwidth assigned to mobile terminals based on their instantaneous channel conditions, buffer level, Quality of Service (QoS) requirements, and other factors. A scheduler in the network schedules the mobile terminals and determines their bandwidth allocations.

Frequency hopping has not previously been used in OFDM systems that employ variable bandwidth allocation. One difficulty in applying frequency hopping techniques to an OFDM system that allows variable bandwidth allocations is that the number of available hopping patterns changes depending on the bandwidth allocations. Furthermore, when mixing transmissions from two or more mobile devices using different bandwidths within one subframe (FDMA), the hopping possibilities for each mobile device depends on the bandwidth allocated to the other mobile devices. Another problem is that bandwidth allocations are dependent on the instantaneous channel conditions of the mobile devices and thus cannot be known in advance. If the frequency pattern is establish without consideration of the bandwidth allocations, the bandwidth allocations must be made to avoid collisions, which will reduce the efficiency of the system.

Accordingly, there is a need for new scheduling techniques to enable frequency hopping in OFDM systems that allow variable bandwidth allocations.

SUMMARY

The present invention provides a method and apparatus to implement frequency hopping in an OFDM system that allows variable bandwidth allocations to mobile terminals. Variable bandwidth assignment is achieved by dynamically allocating different numbers of subcarriers to different mobile terminals depending on their instantaneous channel conditions. The frequency hopping patterns are determined "on-the-fly" based on the current bandwidth assignments for the concurrently scheduled mobile terminals. The bandwidth assignments and frequency hopping patterns are signaled to the mobile terminals in a scheduling grant. Because the frequency hopping patterns are not predefined, the scheduling grant explicitly signals the bandwidth allocations and frequency offset for each time slot within the scheduling interval.

The invention provides a very flexible, simple (low complexity), and low-overhead method to implement uplink frequency hopping in a system supporting flexible bandwidth transmission.

DETAILED DESCRIPTION

Figure 1:
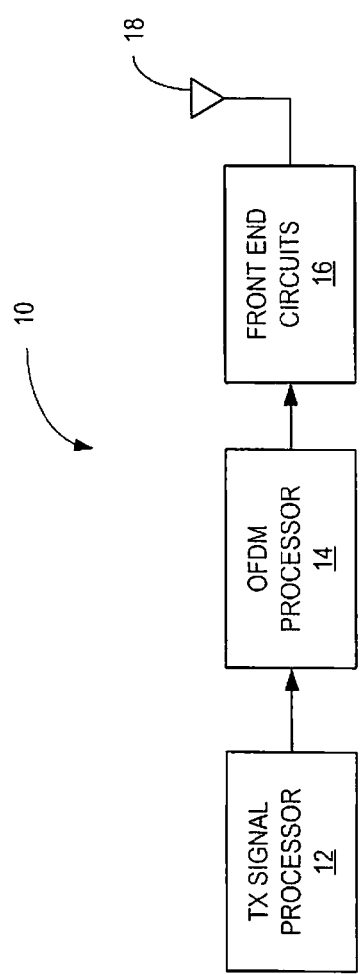
FIG. 1 illustrates an exemplary transmitter for implementing single carrier OFDM with variable bandwidth and frequency hopping.

Referring now to the drawings, an exemplary transmitter according to one exemplary embodiment of the invention is shown and indicated generally by the numeral 10. Transmitter 10 is configured to implement a transmission scheme known as Single Carrier Orthogonal Frequency Division Multiplexing (SC-OFDM). Variable bandwidth assignment and frequency hopping are employed to make efficient use of radio resources. Variable bandwidth assignment is achieved by dynamically allocating different numbers of subcarriers to different mobile terminals depending on their instantaneous channel conditions. The frequency hopping patterns are determined "on-the-fly" based on the current bandwidth assignments. The bandwidth assignments and frequency hopping patterns are signaled to the mobile terminals in a scheduling grant.

Referring to FIG. 1, transmitter 10 comprises a transmit signal processor 12, an Orthogonal Frequency Division Multiplexing (OFDM) processor 14, and a transmitter front end 16. Transmit signal processor 12 generates a coded and modulated signal for transmission to a remote terminal. The transmit signal processor 12 may use any known form of modulation such as Quadrature Amplitude Modulation (QAM) or Quadrature Phase Shift Keying (QPSK). OFDM processor 14 receives the modulated signal from the transmit signal processor 12 and applies OFDM modulation to generate a transmit signal. The functionality of the transmit signal processor 12 and OFDM processor 14 may be implemented by one or more digital signal processors. The transmitter front end 16 couples to a transmit antenna 18. The transmitter front end 16 comprises a digital-to-analog converter to convert the transmit signal to analog form and radio frequency circuits to filter and amplify the transmit signal.

Figure 2:
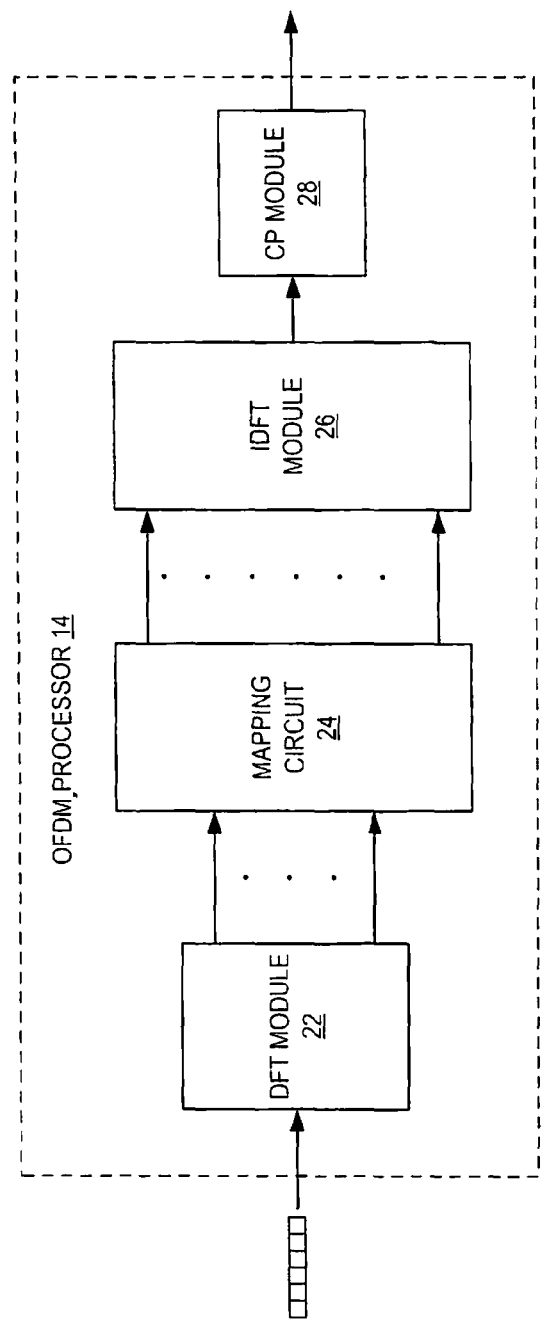
FIG. 2 illustrates an exemplary OFDM processor for a single carrier OFDM transmitter.

FIG. 2 illustrates an exemplary OFDM processor 14 that implements a form of OFDM transmission called single carrier OFDM (SC-OFDM). The components illustrated in FIG. 2 represent functional elements that may be implemented by one or more processors. OFDM processor 14 comprises a Discrete Fourier Transform (DFT) module 22, a subcarrier mapping circuit 24, an Inverse Discrete Fourier Transform (IDFT) module 26, and a Cyclic Prefix (CP) module 28. A block of M modulated symbols in any modulation alphabet is input to the size-M DFT module 22. The DFT module 22 performs a DFT on the modulation symbols to convert the modulation symbols from the time domain to the frequency domain. Mapping circuit 24 maps the frequency samples output by the DFT module 22 to corresponding inputs of a size-N IDFT module 26, where N>M. The unused inputs of the IDFT module 26 are set to zero. IDFT module 26 transforms the frequency samples back to the time domain. In some embodiments of the invention, bandwidth expansion and spectrum shaping (not shown) may be applied to the frequency samples in the frequency domain before conversion back to the time domain. For example, a spectrum shaping circuit may be applied by multiplying the frequency domain samples with a spectrum shaping functions, such as a root-raised-cosine function. The transmit signal corresponding to a single block of modulation symbols is referred to herein as an OFDM symbol. Cyclic prefix module 28 then applies a cyclic prefix to the OFDM symbol.

Single carrier OFDM as illustrated in FIG. 2 may be viewed as OFDM with a DFT-based pre-coding, where each IDFT input corresponds to one OFDM subcarrier. Therefore, the term DFT-spread OFDM or DFTS-OFDM is often used to describe the transmitter structure of FIG. 2. The use of the DFT-based pre-coding gives the final transmitted signal "single carrier" properties, implying that each modulation symbol is "spread" over the entire transmission bandwidth and that the transmitted signal has a relatively low peak-to-average-power ratio compared to normal OFDM transmission. Assuming a sampling rate of f, at the output of the IDFT module 26, the nominal bandwidth of the transmit signal will be $BW=M/N \cdot f_s$.

The OFDM transmitter 10 illustrated in FIG. 1 allows for variation in the instantaneous bandwidth of the transmission by varying the block size M of the modulation symbols input to the DFT module 22. Increasing the block size M will increase the instantaneous bandwidth required for transmission, while decreasing the block size M will decrease the instantaneous bandwidth required for transmission. Furthermore, by shifting the IDFT inputs to which the DFT outputs are mapped, the transmitted signal may be shifted in the frequency domain.

Figure 3:
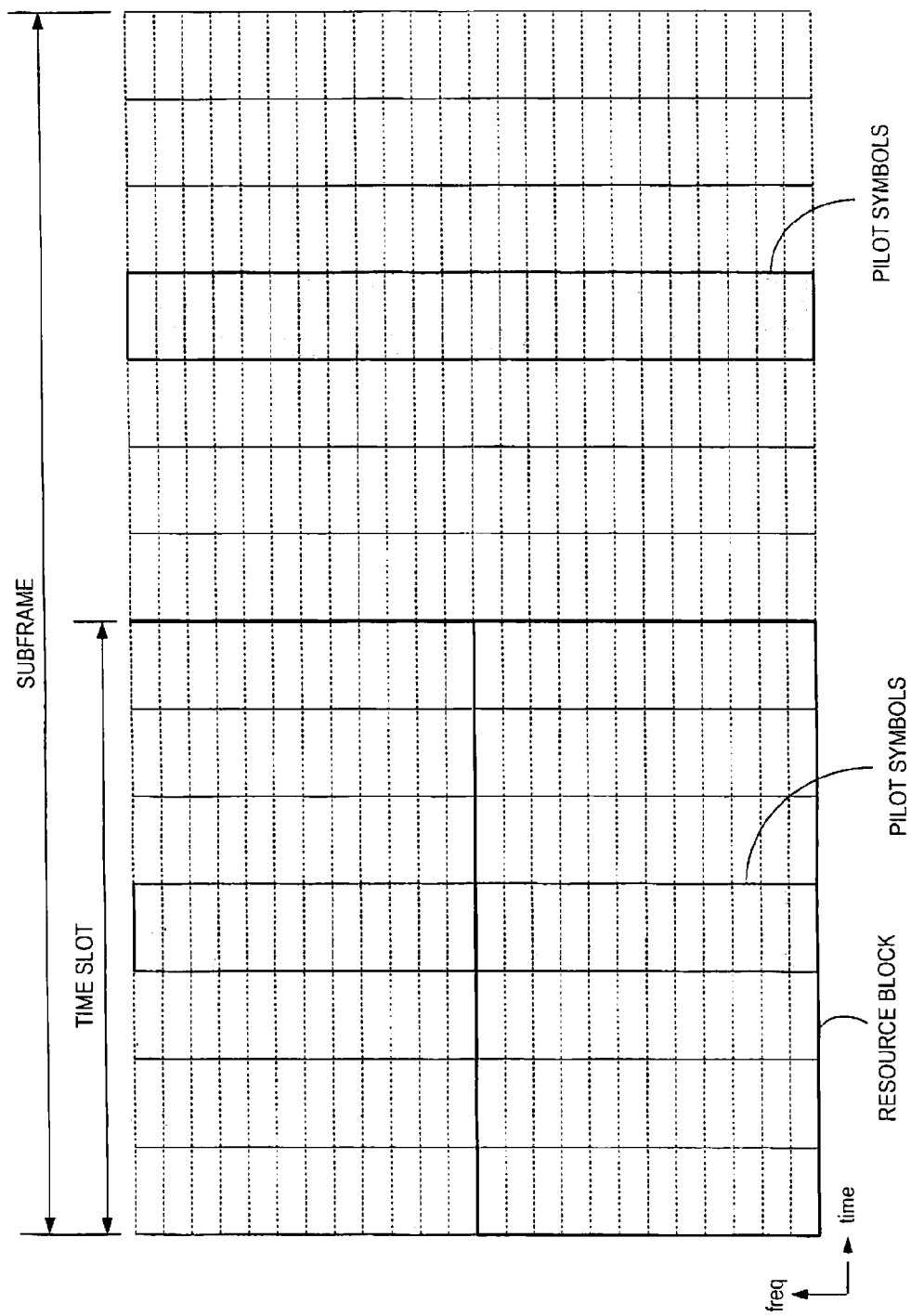
FIG. 3 illustrates the structure of an exemplary OFDM carrier.

FIG. 3 illustrates the structure of an exemplary OFDM carrier for uplink transmissions. The vertical axis in FIG. 3 represents the frequency domain and the horizontal axis represents the time domain. In the frequency domain, the radio resource is divided into a plurality of narrowband subcarriers. A typical OFDM carrier may comprise hundreds or even several thousand subcarriers. In the time domain, the radio resource is divided into time slots. Each time slot comprises a plurality of symbol periods. In this example, a time slot comprises seven (7) symbol periods. One of the symbol periods in each time slot is used to transmit a pilot symbol. The remaining six symbols in each time slot are used to transmit data and/or control signals. The subcarriers in a time slot may be grouped into units known as resource blocks. For example, the exemplary embodiment disclosed herein, a resource block comprises twelve (12) subcarriers over a period equal to one time slot.

For purposes of uplink scheduling, the uplink radio resource is divided in the time domain into scheduling units called subframes. A subframe comprises two or more time slots. In the exemplary embodiment described herein, a subframe comprises two (2) time slots, although a different number of time slots may also be used. During each subframe, an access node, e.g., base station, in the mobile communication network may schedule one or more mobile terminals to transmit on the uplink. The access node indicates the scheduled mobile terminals by sending a scheduling grant on a downlink control channel.

In some systems, variable bandwidth allocation in combination with an orthogonal multiplexing scheme may be used to improve system throughput. In OFDM systems, it may not be efficient to allocate the entire available bandwidth to a single mobile terminal during a given time slot. The data rates that a mobile device may achieve are likely to be limited by the available power of the mobile device. Allocating the entire available bandwidth to a power-limited mobile device would result in a waste of system resources. When the mobile device is unable to use the entire available bandwidth, a smaller transmission bandwidth may be assigned to the mobile device and the remaining bandwidth may be assigned to another mobile terminal. Thus, an orthogonal multiplexing scheme such as frequency division multiplexing (FDM) may be used to share the available bandwidth among two or more mobile terminals.

Figure 4:
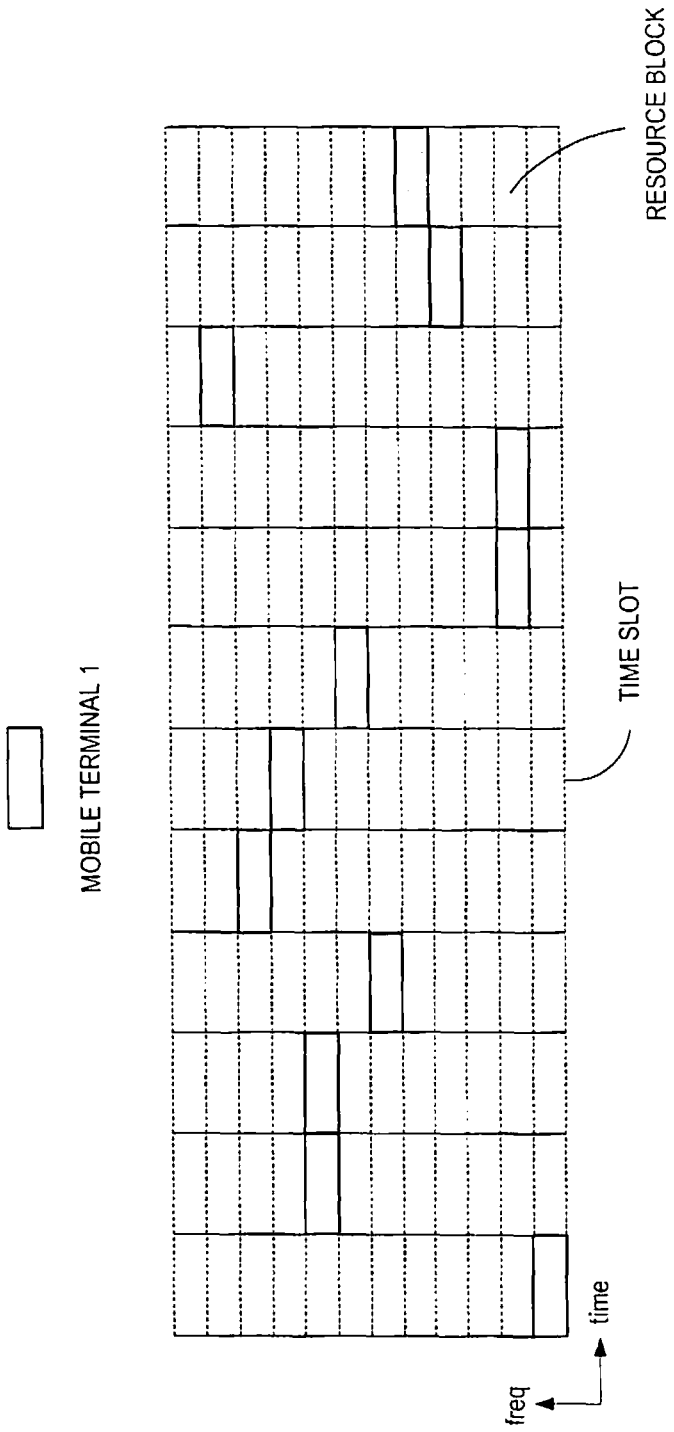
FIG. 4 illustrates an exemplary frequency hopping pattern for a single mobile terminal.

According to the present invention, frequency hopping may be used in combination with variable bandwidth allocation to improve the robustness of the transmitted signal to fading, and thus reduce bit errors that may occur during transmission. In frequency hopping systems, the transmitter changes the frequency of its transmissions over time, e.g., according to a pseudorandom hopping pattern. FIG. 4 illustrates a hopping pattern over twelve resource blocks and twelve time slots. As shown in FIG. 4, the transmitter "hops" from one frequency to another during transmission to spread its signal over a wide frequency band, while at any given moment, the transmitted signal occupies a narrow frequency band. In an OFDM system, frequency hopping may be implemented by shifting the frequency position of the resource blocks assigned to a mobile terminal during a scheduling interval. For example, if the scheduling interval used is one subframe, then the mobile terminal may be assigned different resource blocks in each timeslot within a subframe.

Figure 5:
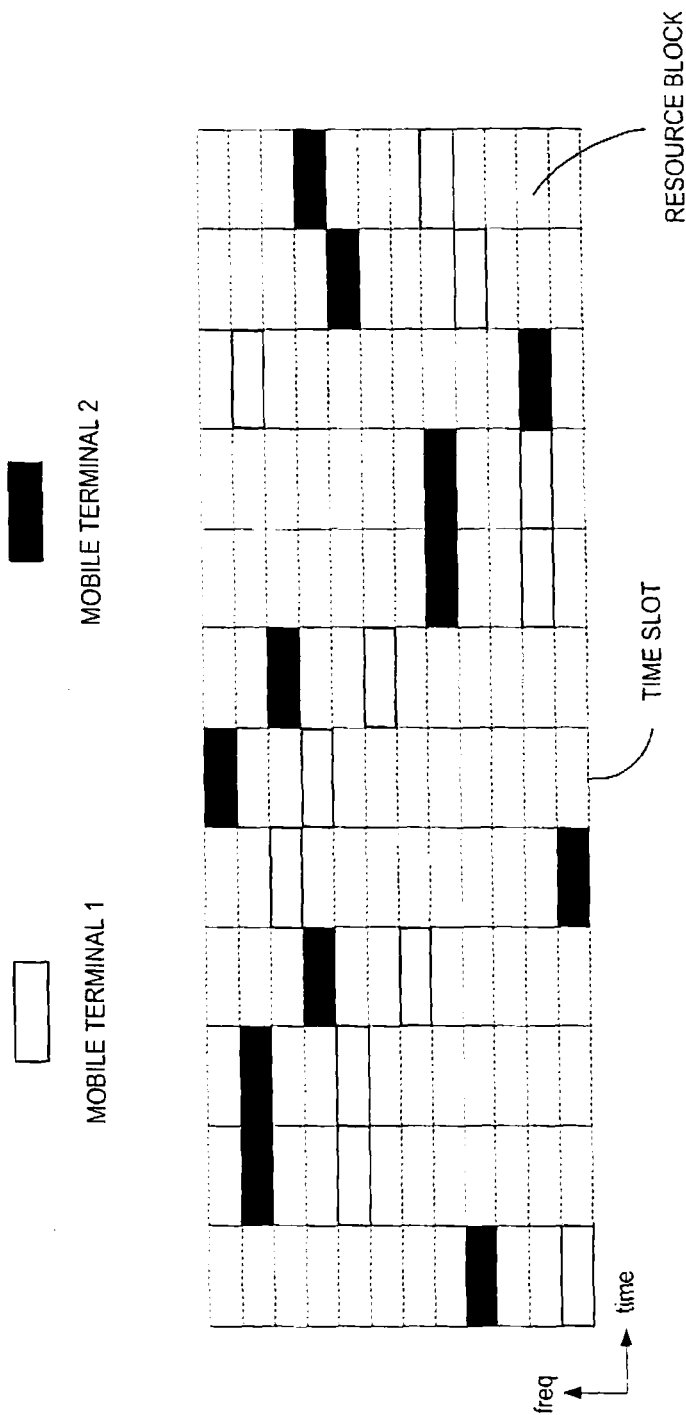
FIG. 5 illustrates mutually orthogonal frequency hopping patterns for two mobile terminals.

In conventional frequency hopping systems, different mobile terminals within the same cell or sector of a mobile communication system are assigned mutually orthogonal frequency hopping patterns so that the mobile devices will not transmit simultaneously on the same frequency in the same time slot. One way to ensure that the hopping patterns are mutually orthogonal is to use the same basic hopping pattern for all mobile devices with different frequency offsets for each mobile terminal. FIG. 5 illustrates how frequency hopping is used to share the available bandwidth between two or more mobile devices. As shown in FIG. 5, each mobile terminal uses the same frequency hopping pattern. However, mobile device 2 has an offset of 3 resource blocks relative to mobile terminal 1. Note that the resource blocks "wrap-around", e.g. an offset of 3 relative to $f_5$ equals $f_0$.

Frequency hopping has not previously been used in Frequency Division Multiplexing (FDM) and OFDM systems that employ variable bandwidth allocation. One difficulty in applying frequency hopping techniques to systems that allows variable bandwidth allocations is that the number of available hopping patterns changes depending on the bandwidth allocations. For a wideband signal, there are fewer hopping options compared to a narrow band signal. As an example, in an OFDM system with eight resource blocks in the frequency domain, for a transmission bandwidth corresponding to one resource block, there are eight different hopping possibilities (eight possible frequency positions). However, for a transmission bandwidth of seven resource blocks, there are only two hopping possibilities (two possible frequency positions). Thus, the same hopping pattern cannot be used in both scenarios.

Figure 6:
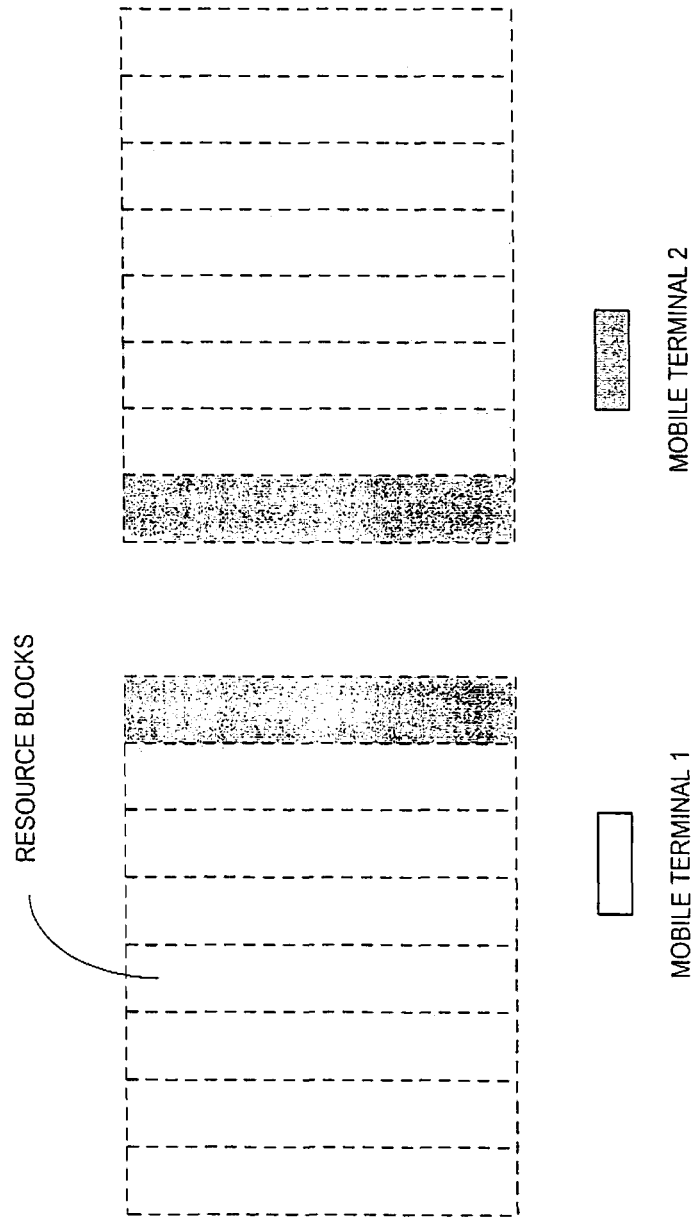
FIG. 6 illustrates how variable bandwidth allocations impact available frequency hopping patterns.

Furthermore, when mixing transmissions from two or more mobile devices using different bandwidths within one subframe (FDMA), the hopping possibilities for each mobile device depends on the bandwidth allocated to the other mobile devices. This constraint is illustrated in FIG. 6. FIG. 6 illustrates two mobile terminals sharing a total of eight resource blocks. Mobile terminal 1 is allocated seven resource blocks and mobile terminal 2 is allocated only one resource block. As seen by this simplified example, there are only two possible frequency positions for mobile terminal 1. In the absence of other users, mobile terminal 2 would have eight possibilities. However, to avoid collisions with mobile terminal 1, mobile terminal 2 is also limited to only two possible frequency positions.

A third problem is that bandwidth allocations are dependent on the instantaneous channel conditions of the mobile devices and thus cannot be known in advance. If the frequency pattern is establish without consideration of the bandwidth allocations, then the predetermined frequency hopping patterns will impose undesirable constraints on the bandwidth allocation. In this case, the bandwidth allocations must be made to avoid collisions, which will reduce the efficiency of the system.

The present invention provides a method for implementing frequency hopping in an OFDM system that allows variable bandwidth allocation. According to the present invention, a scheduler at the base station or within the network dynamically determines both the bandwidth allocation and the frequency hopping pattern to be used by each mobile terminal that is scheduled during a given scheduling interval. Scheduling is thus not based on pre-defined frequency hopping patterns. The scheduler then explicitly signals the bandwidth allocations and frequency hopping patterns to the scheduled mobile terminals in a scheduling grant. Thus, the frequency hopping pattern may be changed from one scheduling interval to the next depending on the bandwidth allocations.

Figure 7:
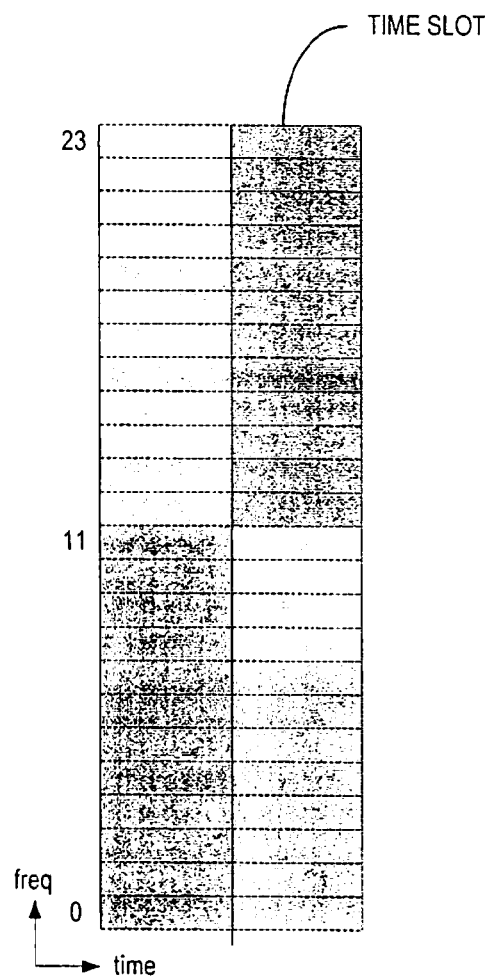
FIG. 7 illustrates an exemplary frequency hopping pattern combined with a variable bandwidth allocation.

FIG. 7 provides a simple example to illustrate how scheduling is performed according to one exemplary embodiment. FIG. 7 illustrates an OFDM carrier with 24 resource blocks. In the following discussion, the index i denotes the mobile terminal, the index j denotes the time slot, $L_i$ is the bandwidth allocation for the $i^{th}$ mobile terminal expressed as the number of resource blocks, and $K_i(j)$ is the frequency offset for the $i^{th}$ mobile terminal in the $j^{th}$ time slot. Three mobile terminals are being scheduled to transmit concurrently during a scheduling interval comprising two time slots, e.g., one subframe. A first mobile terminal denoted as Mobile terminal 1 is allocated eight resource blocks, a second mobile terminal denoted Mobile terminal 2 is allocated twelve resource blocks, and a third mobile terminal denoted Mobile terminal 3 is allocation 4 resource blocks. The bandwidth allocation is the same in each time slot during the scheduling interval. In the first time slot (slot "0"), Mobile terminal 1 is assigned a frequency offset $K_1(0)=12$, Mobile terminal 2 is assigned a frequency offset $K_2(0)=0$, Mobile terminal 3 is assigned a frequency offset $K_3(0)=20$. In the second time slot (slot "1"), Mobile terminal 1 is assigned a frequency offset $K_1(1)=0$, Mobile terminal 2 is assigned a frequency offset $K_2(1)=12$, and mobile terminal 3 is assigned a frequency offset $K_3(1)=8$.

From the example shown in FIG. 7, it may be seen that three parameters need to be signaled to each mobile terminal: the bandwidth assignment $L_i$ for the scheduling interval, the frequency offset for the first time slot $K_i(0)$, and the frequency offset $K_i(1)$ for the second time slot. It should be noted that because predefined hopping patterns are not used, the frequency offset for the second time slot is not dependent on the frequency offset used in the first time slot. Thus, in the example above, the base station needs to signal the frequency offset for the second time slot as well as the first time slot. This procedure is referred to herein as explicit signaling.

The three parameters $L_i$ (the assigned bandwidth measured in number of resource blocks), $K_i(0)$ (the frequency offset of the assignment for the first slot), and $K_i(1)$ (the frequency offset of the assignment for the second slot) may be signaled independently of each other. However, there is a dependency between the value of $L_i$ and the possible values of $K_i(0)$ and $K_i(1)$. More exactly, for a given value of $L_i$, $K_i(0)$ and $K_i(1)$ may only take values in the range 0 to $N-L_i$, where N is the total number of available resource blocks. Thus, by jointly encoding the parameters $L_i$, $K_i(0)$, and $K_i(1)$ the total amount of bits to signal $L_i$, $K_i(0)$, and $K_i(1)$ may be reduced. This may be expressed so that the combination of $L_i$, $K_i(0)$, and $K_i(1)$ are signaled as a single parameter, rather than signaling $L_i$, $K_i(0)$, and $K_i(1)$ as three different independent parameters.

In some scenarios, frequency hopping may not always be used. One such case is when frequency-domain channel-dependent scheduling is used. If channel-dependent scheduling is used, explicit signaling of $K_i(1)$ implies unnecessary overhead. To avoid this, different formats of the scheduling grants may be provided: one format including the parameter $K_i(1)$ and one format not including the parameter $K_i(1)$.

Figure 8:
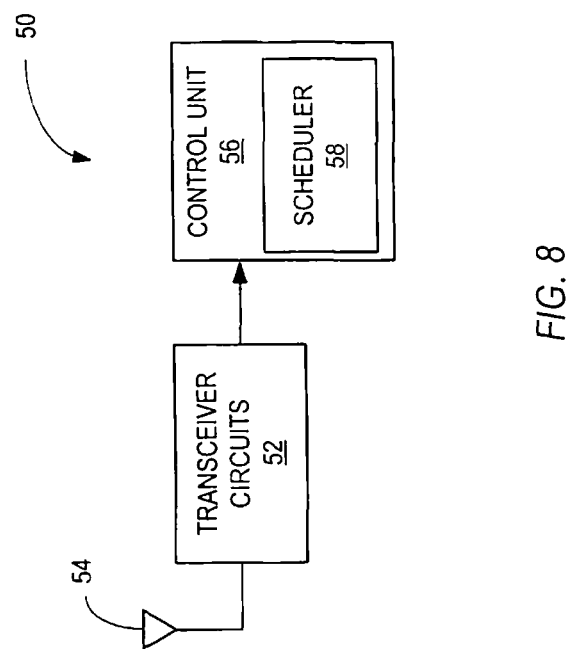
FIG. 8 illustrates an exemplary access node in a mobile communication network including a scheduler for determining bandwidth allocations and frequency hopping patterns.

FIG. 8 illustrates an exemplary access node 50 for scheduling uplink transmission in a mobile communication system. The access node 50 comprises transceiver circuits 52 coupled to an antenna 54 for communicating with one or more mobile terminals, and a control circuit 56 for controlling the operation of the access node 50. The control circuit 56 may comprise one or more processors that carry out the various control functions, such as radio resource control. The control circuit 56 includes a scheduler 58 to schedule uplink transmission as described above. The scheduler 58 is responsible for determining which mobile terminals to schedule for transmission during each scheduling interval and to send a scheduling grant to the scheduled mobile terminals.

Figure 9:
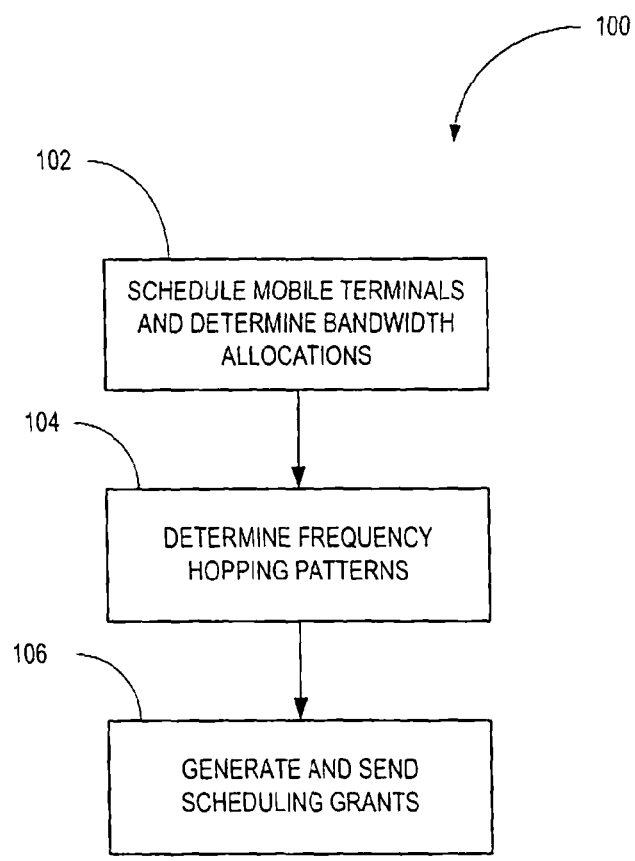
FIG. 9 illustrates an exemplary method implemented by a scheduler for scheduling uplink transmissions in a mobile communication system.

FIG. 9 illustrates an exemplary procedure 100 implemented by the scheduler 58. The procedure 100 shown in FIG. 9 is repeated in each scheduling interval when frequency hopping is used. Before the start of a given scheduling interval, the scheduler 58 selects the mobile terminals and determines the bandwidth allocations for the selected mobile terminals (block 102). The selection of mobile terminals and the determination of bandwidth allocations are based on the channel conditions, buffer levels, and other relevant factors. Once the bandwidth allocations are determined, the scheduler 58 determines frequency hopping patterns for each scheduled mobile terminal (block 104) and sends a scheduling grant to each scheduled mobile terminal (block 106).

The invention provides a very flexible, simple (low complexity), and low-overhead method to implement uplink frequency hopping in a system supporting flexible bandwidth transmission. In general, those skilled in the art will appreciate that the present invention is not limited by the foregoing description and accompanying drawings. Instead, the present invention is limited only by the claims and their legal equivalents.

What is claimed is:

1. A method of scheduling transmissions in a mobile communication system, said method comprising:
    determining, on a scheduling interval basis, a bandwidth assignment for each of two or more concurrently scheduled mobile terminals for a scheduling interval comprising two or more time slots;
    determining a frequency hopping pattern for each of said two or more concurrently scheduled mobile terminals over said scheduling interval based on said bandwidth assignments for said two or more concurrently scheduled mobile terminals; and
    transmitting to each of said two or more concurrently scheduled mobile terminals the bandwidth assignment and frequency hopping pattern determined respectively for each of the mobile terminals for the scheduling interval in a scheduling grant.

2. The method of claim 1 wherein the frequency hopping patterns for said two or more concurrently scheduled mobile terminals are determined such that in the first time slot of said scheduling interval, the frequency hopping patterns are orthogonal to each other, and in each subsequent time slot of said scheduling interval, the frequency hopping pattern for each mobile terminal is cyclically shifted by a number of frequency positions, said number being the same for all concurrently scheduled mobile terminals in that time slot.

3. The method of claim 1, wherein the scheduling interval is an interval for which transmission of uplink data is scheduled.

4. The method of claim 3, wherein the scheduling interval comprises two time slots.

5. The method of claim 1, wherein the frequency hopping pattern for each of the two or more concurrently scheduled mobile terminals designates a hopping sequence within the scheduling interval.

6. A base station in a mobile communication system for scheduling transmissions for a plurality of mobile devices, said base station comprising:
    communication circuitry configured to communicate with one or more mobile terminals; and
    processing circuitry configured to:
        determine, on a scheduling interval basis, a bandwidth assignment for each of two or more concurrently scheduled mobile terminals for a scheduling interval comprising two or more time slots;
        determine a frequency hopping pattern for each of said two or more concurrently scheduled mobile terminals over said scheduling interval based on said bandwidth assignments for said two or more concurrently scheduled mobile terminals; and
        transmit, via the communication circuitry, to each of said two or more concurrently scheduled mobile terminals the bandwidth assignment and frequency hopping pattern determined respectively for each of the two or more concurrently scheduled mobile terminals for the scheduling interval in a scheduling grant.

7. The base station of claim 6 wherein the frequency hopping patterns for said two or more concurrently scheduled mobile terminals are determined such that in the first time slot of said scheduling interval, the frequency hopping patterns are orthogonal to each other, and in each subsequent time slot of said scheduling interval, the frequency hopping pattern for each mobile terminal is cyclically shifted by a number of frequency positions, said number being the same for all concurrently scheduled mobile terminals in that time slot.

8. The base station of claim 6, wherein the scheduling interval is an interval for which transmission of uplink data is scheduled.

9. The base station of claim 8, wherein the scheduling interval comprises two time slots.

10. The base station of claim 6, wherein the frequency hopping pattern for each of the two or more concurrently scheduled mobile terminals designates a hopping frequency sequence within the scheduling interval.

11. A computer program product stored on a non-transitory computer readable medium and comprising instructions that, when executed by a processor of a base station in a mobile communication system, causes the base station to schedule transmissions for a plurality of mobile devices, by:

determining, on a scheduling interval basis, a bandwidth assignment for each of two or more concurrently scheduled mobile terminals for a scheduling interval comprising two or more time slots;

determining a frequency hopping pattern for each of said two or more concurrently scheduled mobile terminals over said scheduling interval based on said bandwidth assignments for said two or more concurrently scheduled mobile terminals; and transmitting to each of said two or more concurrently scheduled mobile terminals the bandwidth assignment and frequency hopping pattern determined respectively for each of the mobile terminals for the scheduling interval in a scheduling grant.

12. The computer program product of claim 11 wherein the frequency hopping patterns for said two or more concurrently scheduled mobile terminals are determined such that in the first time slot of said scheduling interval, the frequency hopping patterns are orthogonal to each other, and in each subsequent time slot of said scheduling interval, the frequency hopping pattern for each mobile terminal is cyclically shifted by a number of frequency positions, said number being the same for all concurrently scheduled mobile terminals in that time slot.

13. The computer program product of claim 11, wherein the scheduling interval is an interval for which transmission of uplink data is scheduled.

14. The computer program product of claim 13, wherein the scheduling interval comprises two time slots.

15. The computer program product of claim 11, wherein the frequency hopping pattern for each of the two or more concurrently scheduled mobile terminals designates a hopping sequence within the scheduling interval.

* * * * *

UNITED STATES PATENT AND TRADEMARK OFFICE
CERTIFICATE OF CORRECTION

| | | |
|---|---|---|
| PATENT NO. | : 9,496,918 B2 | Page 1 of 1 |
| APPLICATION NO. | : 14/334811 | |
| DATED | : November 15, 2016 | |
| INVENTOR(S) | : Dahlman et al. | |

It is certified that error appears in the above-identified patent and that said Letters Patent is hereby corrected as shown below:

In the Specification

In Column 1, Line 6, delete "2011." and insert -- 2011, now Pat. No. 9,294,238. --, therefor.

In Column 4, Line 14, delete "f," and insert -- $f_s$ --, therefor.

Signed and Sealed this
Thirtieth Day of May, 2017

Michelle K. Lee
*Director of the United States Patent and Trademark Office*